United States Patent
Zhang et al.

(10) Patent No.: US 11,703,477 B2
(45) Date of Patent: Jul. 18, 2023

(54) NONDESTRUCTIVE TESTING METHOD AND DEVICE FOR DETECTING AND DISTINGUISHING INTERNAL DEFECT AND EXTERNAL DEFECT OF WIRE ROPE

(71) Applicant: HARBIN INSTITUTE OF TECHNOLOGY (SHENZHEN) (INSTITUTE OF SCIENCE AND TECHNOLOGY INNOVATION), Shenzhen (CN)

(72) Inventors: Dong Lai Zhang, Shenzhen (CN); En Chao Zhang, Shenzhen (CN); Wei Gao, Shenzhen (CN); Xiao Lan Yan, Shenzhen (CN); Shi Min Pan, Shenzhen (CN)

(73) Assignee: HARBN INSTITUTE OF TECHNOLOGY (SHENZHEN) (INSTITUTE OF SCIENCE AND TECHNOLOGY INNOVATION), Shenzhen (CN)

( * ) Notice: Subject to any disclaimer, the term of this patent is extended or adjusted under 35 U.S.C. 154(b) by 160 days.

(21) Appl. No.: 17/436,086

(22) PCT Filed: Mar. 17, 2021

(86) PCT No.: PCT/CN2021/081320
§ 371 (c)(1),
(2) Date: Sep. 3, 2021

(87) PCT Pub. No.: WO2021/248962
PCT Pub. Date: Dec. 16, 2021

(65) Prior Publication Data
US 2022/0187246 A1 Jun. 16, 2022

(30) Foreign Application Priority Data
Jun. 11, 2020 (CN) .......................... 202010529779.1

(51) Int. Cl.
*G01N 27/83* (2006.01)
*G06N 3/02* (2006.01)

(52) U.S. Cl.
CPC .............. *G01N 27/83* (2013.01); *G06N 3/02* (2013.01)

(58) Field of Classification Search
CPC ........... G01N 27/85; G01N 27/83; G06N 3/02
(Continued)

(56) References Cited

U.S. PATENT DOCUMENTS

| 4,659,991 A | * | 4/1987 | Weischedel | ............ G01N 27/82 324/241 |
| 5,430,665 A | * | 7/1995 | Jin | ........................ G01B 11/043 33/735 |

(Continued)

FOREIGN PATENT DOCUMENTS

| CN | 101216460 A | 7/2008 |
| CN | 102798660 A | 11/2012 |

(Continued)

OTHER PUBLICATIONS

Kim, Ju-Won, and Seunghee Park. "Magnetic flux leakage sensing and artificial neural network pattern recognition-based automated damage detection and quantification for wire rope non-destructive evaluation." Sensors 18.1 (2018): 109. (Year: 2018).*

(Continued)

*Primary Examiner* — Christopher P McAndrew
(74) *Attorney, Agent, or Firm* — Bayramoglu Law Offices LLC

(57) ABSTRACT

A nondestructive testing method for detecting and distinguishing internal and external defects of a wire rope includes: acquiring a magnetic flux signal and a MFL signal of a detected wire rope; preprocessing the magnetic flux signal and the MFL signal of the detected wire rope;

(Continued)

comparing a preprocessed magnetic flux signal and a preprocessed MFL signal with a preset magnetic flux signal threshold and a preset MFL signal threshold respectively, and calculating a defect position; extracting a magnetic flux signal of a defect and an MFL signal of the defect based on the defect position; calculating a defect width of the detected wire rope based on the magnetic flux signal of the defect and the MFL signal of the defect; calculating a defect cross-sectional area loss of the detected wire rope based on the defect width; and determining whether the defect is the internal defect or the external defect.

17 Claims, 3 Drawing Sheets

(58) Field of Classification Search
USPC .......................................................... 324/228
See application file for complete search history.

(56) References Cited

U.S. PATENT DOCUMENTS

| | | | |
|---|---|---|---|
| 5,565,771 A | | 10/1996 | Hamelin et al. |
| 5,804,964 A | * | 9/1998 | Hamelin ................. B66B 7/123 |
| | | | 324/242 |
| 2013/0147471 A1 | * | 6/2013 | Weischedel ........ G01N 27/9006 |
| | | | 324/238 |
| 2017/0160236 A1 | | 6/2017 | Uhlig et al. |
| 2020/0003729 A1 | * | 1/2020 | Huang ................. G01N 17/006 |

FOREIGN PATENT DOCUMENTS

| | | |
|---|---|---|
| CN | 102798667 A | 11/2012 |
| CN | 104514987 A | 4/2015 |
| CN | 104903718 A | 9/2015 |
| CN | 110006338 A | 7/2019 |
| CN | 110568059 A | 12/2019 |
| CN | 111024807 A | 4/2020 |
| CN | 111579637 A | 8/2020 |
| EP | 3951381 A1 | 2/2022 |
| GB | 2492745 A * | 1/2013 ............. G01N 27/83 |
| WO | 2007012331 A2 | 2/2007 |
| WO | WO-2013023818 A1 * | 2/2013 ............... D07B 7/08 |
| WO | WO-2017035591 A1 * | 3/2017 ............. G01N 27/83 |

OTHER PUBLICATIONS

Zhang, Juwei, Pengbo Zheng, and Xiaojiang Tan. "Recognition of broken wire rope based on remanence using EEMD and wavelet methods." Sensors 18.4 (2018): 1110. (Year: 2018).*
Zhang, Juwei, and Xiaojiang Tan. "Quantitative inspection of remanence of broken wire rope based on compressed sensing." Sensors 16.9 (2016): 1366. (Year: 2016).*
Kim, Ju-Won, et al. "Magnetic flux leakage and pattern recognition based automated steel cable NDE." 9th European Workshop on Structural Health Monitoring, EWSHM 2018. NDT. net, 2018. (Year: 2018).*
Xin Rongya, et al., Characteristic of Signal from Magnetic Flux Examination of Loss of Metallic Area in Bridge Cables, Journal of Tongji University (Natural Science), 2018, pp. 1326-1333, vol. 46, No. 10.
Enchao Zhang, et al., Magnetic Flux Leakage Testing of Wire Rope Defects with Denoising, 2019 IEEE 3rd Information Technology, Networking, Electronic and Automation Control Conference (ITNEC 2019), 2019, pp. 1574-1577.
Ju-Won Kim, et al., Magnetic Flux Leakage Sensing and Artificial Neural Network Pattern Recognition-Based Automated Damage Detection and Quantification for Wire Rope Non-Destructive Evaluation, Sensors, 2018, pp. 1-19, vol. 18, No. 109.
Shimin Pan, et al., Nondestructive Testing for Shallow Defect of Ferromagnetic Objects Based on Magnetic Probe Structure, IEEE Transactions on Magnetics, 2018, vol. 54, No. 11.

* cited by examiner

NONDESTRUCTIVE TESTING METHOD AND DEVICE FOR DETECTING AND DISTINGUISHING INTERNAL DEFECT AND EXTERNAL DEFECT OF WIRE ROPE

CROSS REFERENCE TO THE RELATED APPLICATIONS

This application is the national phase entry of International Application No. PCT/CN2021/081320, filed on Mar. 17, 2021, which is based upon and claims priority to Chinese Patent Application No. 202010529779.1, filed on Jun. 11, 2020, the entire contents of which are incorporated herein by reference.

TECHNICAL FIELD

The present invention relates to the technical field of nondestructive detection, and in particular, to a nondestructive testing method and device for detecting and distinguishing an internal defect and an external defect of a wire rope.

BACKGROUND

As a flexible member, a wire rope has a strong load capacity, outstanding flexibility, and excellent work stability, and thus is widely applied in mining, shipping, construction, transportation, and other fields. After long-term use, however, the wire rope will inevitably experience fatigue damage such as wear, wire fracture, and corrosion, and the damage becomes more serious with the extension of a use cycle. If the wire rope cannot be replaced before it is completely fractured, the safety in production will be seriously affected, and even equipment and personal safety are threatened, causing huge economic losses and adverse social effects. Defects of the wire rope can be divided into an external defect and an internal defect. The difficulty of detection for a defect increases as the depth of the defect increases. The prior detection methods can neither quantitatively detect the internal defect, nor distinguish the internal defect and the external defect.

Electromagnetic detection is the most effective method at present, and is divided into saturated excitation detection and unsaturated excitation detection according to an excitation condition. Unsaturated excitation detection poses strict requirements on a sensor, an environment and a manner, and cannot perform quantitative detection accurately. Therefore, unsaturated excitation detection cannot be applied to practical detection. Saturated excitation detection can avoid the above shortcomings, and improve accuracy of quantitative detection. Therefore, saturated excitation detection can be better applied to practical detection.

There are two main saturated excitation detection methods, namely magnetic flux detection and magnetic flux leakage (MFL) detection. Magnetic flux detection is mainly used to detect an amount of a change in magnetic flux of a detected object. Magnetic flux includes main magnetic flux, leakage magnetic flux, yoke magnetic flux, and the like. In this method, a detected flux value is related to a cross-sectional area loss of the detected object, and both the external defect and the internal defect can be detected through nondestructive magnetic flux detection. However, when the axial width of a defect is relatively small, the method has poor detection effect, cannot detect the defect quantitatively, and cannot identify the internal defect. The prior magnetic flux detection method can neither quantitatively detect all defects, nor calculate a defect depth. MFL detection is mainly used to detect the strength of a leakage magnetic field on a surface of the detected object by using a sensor array. MFL detection has a high identification rate for a defect with a relatively small axial width, and can detect the defect width accurately. However, MFL detection cannot accurately identify information of a defect with a relatively large axial width. Since the defect depth seriously affects detection accuracy, MFL detection fails to quantitatively detect all defects.

Therefore, the prior detection methods cannot distinguish the internal defect and the external defect of the wire rope, have low detection accuracy, and cannot calculate the defect depth.

SUMMARY

To resolve the above technical problems, the present invention provides a nondestructive testing method and device for detecting and distinguishing an internal defect and an external defect of a wire rope, which can distinguish the internal defect and the external defect of the wire rope and calculate a defect depth, making the detection more accurate.

Therefore, technical solutions used in the present invention are as follows:

a nondestructive testing method for detecting and distinguishing an internal defect and an external defect of a wire rope includes the following steps:

step S10: acquiring a magnetic flux signal and an MFL signal of a detected wire rope;

step S20: preprocessing the magnetic flux signal and the MFL signal of the detected wire rope;

step S30: comparing a preprocessed magnetic flux signal and a preprocessed MFL signal with a preset magnetic flux signal threshold and a preset MFL signal threshold respectively, and calculating a defect position;

step S40: extracting a magnetic flux signal of a defect and an MFL signal of the defect based on the defect position;

step S50: calculating a defect width flw of the detected wire rope based on the magnetic flux signal of the defect and the MFL signal of the defect;

step S60: calculating a defect cross-sectional area loss fs of the detected wire rope based on the defect width flw of the detected wire rope; and step S70: determining whether the defect is the internal defect or the external defect, specifically including:

calculating a peak-to-peak value FV of a waveform of the MFL signal of the defect according to a formula FV=FH−FL, where FH represents a peak value of the waveform of the MFL signal of the defect, and FL represents a valley value of the waveform of the MFL signal of the defect;

designing a relation function, namely, ffs=f2(FV, flw), where f2 represents a trained system of higher-degree equations or multi-layer neural network, and ffs represents a virtual cross-sectional area loss;

substituting the defect width flw obtained in step S50 and the peak-to-peak value FV of the waveform of the MFL signal of the defect into the designed relation function, to calculate ffs; and comparing ffs with fs, and if |fs−ffs|>µ, determining that the defect is the internal defect; otherwise, determining that the defect is the external defect, where µ represents a preset defect decision value.

Further, µ may be set as a cross-sectional area loss rate of one fractured wire, or may be set based on an actual situation.

Further, the detected wire rope is excited to a saturated state or an approximately saturated state, and then the magnetic flux signal and the MFL signal of the detected wire rope are acquired.

As a further improvement of the present invention, the nondestructive testing method for detecting and distinguishing the internal defect and the external defect of the wire rope further includes:

step S80: calculating a defect depth, specifically including:

based on a result of S70, if the defect is the external defect, determining that the defect depth is 0; otherwise, determining that the defect depth is not equal to 0, and performing the following step:

calculating the defect depth fd according to the following formula:

$$fd = f3(fs, ffs, flw)$$

where f3 represents a trained system of higher-degree equations or multi-layer neural network, flw represents the defect width of the detected wire rope, fs represents the defect cross-sectional area loss of the detected wire rope, and ffs represents the virtual cross-sectional area loss.

As a further improvement of the present invention, the trained system of higher-degree equations or multi-layer neural network, namely, f2, in step S70 is obtained by performing the following steps:

step S721: designing x defect widths and y defect cross-sectional area losses, namely, a total of x×y standard surface defects, where both x and y are natural numbers;

step S722: performing steps S10 to S60 to calculate corresponding peak-to-peak values of MFL waveforms of the x×y standard surface defects; and step S723: performing training by using the obtained peak-to-peak value of the MFL waveform of the defect and the defect width of the standard surface defect as input independent variables, and ffs as an output standard quantity, to obtain the trained system of higher-degree equations or multi-layer neural network, namely, f2.

As a further improvement of the present invention, the trained system of higher-degree equations or multi-layer neural network, namely, f3, in step S80 is obtained by performing the following steps:

step S821: designing x defect widths, y defect cross-sectional area losses, and z different depths, namely, a total of x×y×z standard defects, where x, y, and z are all natural numbers;

step S822: performing steps S10 to S70 to calculate corresponding ffs of each of the x×y×z standard defects; and step S823: performing training by using the obtained ffs, the defect cross-sectional area loss, and the defect width as the input independent variables, and the defect depth as an output standard quantity, to obtain the trained system of higher-degree equations or multi-layer neural network, namely, f3.

As a further improvement of the present invention, step S10 includes: obtaining the magnetic flux signal of the detected wire rope by using a magnetic flux detection sensor, obtaining the MFL signal of the detected wire rope by using a magnetic field strength detection sensor, and performing the following step to preliminarily process the obtained magnetic flux signal of the detected wire rope to eliminate impact of a speed of the wire rope:

performing time integration on the magnetic flux signal by using an integrator according to the following formula, and then acquiring data through equal-space sampling:

$$\begin{cases} \overline{Y} = \int S dt \\ Y_i = \overline{Y}_m (i = 1, 2, \ldots, N), \end{cases}$$

where $Y_i$ represents a preliminarily processed magnetic flux signal of the detected wire rope, S represents the obtained magnetic flux signal of the detected wire rope, dt represents time differentiation, and N represents a total quantity of sampling points; or performing equal-distance space integration on the magnetic flux signal by using an integrator according to the following formula, and then performing acquisition:

$Y = \int S dl$, where Y represents a preliminarily processed magnetic flux signal of the detected wire rope, dl represents differentiation of a spatial distance, and S represents the obtained magnetic flux signal of the detected wire rope.

As a further improvement of the present invention, the step of preprocessing the magnetic flux signal of the detected wire rope in step S20 includes: performing outlier elimination, noise filtering, and baseline removal on the magnetic flux signal of the detected wire rope, to improve a signal-to-noise rate of the magnetic flux signal and facilitate feature extraction of the signal.

As a further improvement of the present invention, the step of performing outlier elimination on the magnetic flux signal of the detected wire rope includes:

performing outlier elimination on the magnetic flux signal Y of the detected wire rope, where assuming that Y(i) represents an $i^{th}$ magnetic flux acquisition signal, $Y(i)=[Y(i-1)+Y(i+1)]/2$ (i=1, 2, . . . , N) when Y(i) is much greater than previous and next magnetic flux signal values, a signal $Y_1(i)$ is obtained after outlier elimination, and N represents the total quantity of sampling points.

As a further improvement of the present invention, the step of performing noise filtering on the magnetic flux signal of the detected wire rope includes: performing noise filtering on the magnetic flux signal of the detected wire rope through adaptive filtering, wavelet transform, smooth filtering, or empirical mode decomposition, where a calculation formula of performing noise filtering on the magnetic flux signal of the detected wire rope through smooth filtering is as follows:

$$Y_2(i) = \frac{\sum_{i=m}^{m+n} Y_1(i)}{n} (m = 1, 2, \ldots, N-n)$$

where n represents a quantity of pieces of data to be averaged, and N represents the total quantity of sampling points.

As a further improvement of the present invention, the step of performing baseline removal on the magnetic flux signal of the detected wire rope includes:

performing baseline removal on the magnetic flux signal of the detected wire rope through envelope spectrum extraction, wavelet decomposition, window averaging, or empirical mode decomposition, where the step of performing baseline removal on the magnetic flux signal of the detected wire rope through empirical mode decomposition includes:

obtaining all maximum points and minimum points of a data sequence $Y_2(i)$ of the signal, fitting the maximum points and the minimum points to be an upper envelope line and a lower envelope line of the original sequence respectively by using a cubic spline function, obtaining an average value m1 of the upper envelope line and the lower envelope line, and obtaining, by subtracting m1 from the data sequence $Y_2(i)$, a new sequence $Y_3(i)$ with a low frequency being subtracted, namely, $Y_3(i)=Y_2(i)-m1$.

As a further improvement of the present invention, the step of preprocessing the MFL signal of the detected wire rope in step S20 includes: performing outlier elimination, noise filtering, baseline removal, and strand wave noise filtering on each MFL signal of the detected wire rope, to improve a signal-to-noise rate of the MFL signal and facilitate feature extraction of the signal.

As a further improvement of the present invention, the step of performing outlier elimination on each MFL signal of the detected wire rope includes:

performing outlier elimination on each MFL signal X, where assuming that $X_{i,j}$ represents a $j^{th}$ sampling value of an $i^{th}$ Hall sensor, when $X_{i,j}$ is much greater than previous and next MFL signal values, $$X_{i,j} = \frac{X_{i,(j+1)} + X_{i,(j-1)}}{2}$$

where a signal $X_{i,j}$ is obtained after outlier elimination.

As a further improvement of the present invention, the step of performing noise filtering on each MFL signal of the detected wire rope includes:

performing noise filtering on each MFL signal of the detected wire rope through adaptive filtering, wavelet transform, smooth filtering, or empirical mode decomposition, where a calculation formula of performing noise filtering on each MFL signal of the detected wire rope through smooth filtering is as follows:

$$\overline{X}_{i,j} = \frac{1}{n}\sum_{j=m}^{m+n} X_{i,j}(i = 1, 2, \ldots, k, \ m = 1, 2, \ldots, N-n)$$

where n represents the quantity of pieces of data to be averaged, N represents the total quantity of sampling points, and k represents a quantity of paths of the magnetic field strength detection sensor for acquiring the MFL signal of the detected wire rope.

As a further improvement of the present invention, the step of performing baseline removal on each MFL signal of the detected wire rope includes:

performing baseline removal on each MFL signal of the detected wire rope through envelope spectrum extraction, wavelet decomposition, window averaging, or empirical mode decomposition, where the step of performing baseline removal on each MFL signal of the detected wire rope through empirical mode decomposition includes:

obtaining all maximum points and minimum points of a data sequence Xy of an MFL signal obtained after outlier elimination, fitting the maximum points and the minimum points to be an upper envelope line and a lower envelope line of the original sequence respectively by using the cubic spline function, obtaining an average value m1 of the upper envelope line and the lower envelope line, and obtaining, by subtracting n1 from the original data sequence, a new sequence X1 with a low frequency being subtracted, namely, X1=Xy−n1.

As a further improvement of the present invention, the step of performing strand wave noise filtering on each MFL signal of the detected wire rope includes:

performing strand wave noise filtering on each MFL signal of the detected wire rope through wavelet decomposition, empirical mode decomposition, or adaptive filtering, or by using a gradient method, where the step of performing strand wave noise filtering on each MFL signal of the detected wire rope by using the gradient method includes:

performing first-order differentiation on an image by using the gradient method, where for an image $X_1(x,y)$, a gradient of the image $X_1(x,y)$ at coordinates (x,y) is expressed as a two-dimensional column vector:

$$\nabla f = \begin{bmatrix} G_x \\ G_y \end{bmatrix} = \begin{bmatrix} \frac{\partial f}{\partial x} \\ \frac{\partial f}{\partial y} \end{bmatrix}$$

where a module of the vector is:

$$\nabla f = mag(\nabla f) = [G_x^2 + G_y^2]^{\frac{1}{2}} = \left[\left(\frac{\partial f}{\partial x}\right)^2 + \left(\frac{\partial f}{\partial y}\right)^2\right]^{\frac{1}{2}};$$

and performing summation on a plurality of MFL signals to obtain an MFL sum signal $X_2$.

As a further improvement of the present invention, the step of calculating the defect position in step S30 includes the following steps:

step S31: setting a preset threshold mp of the magnetic flux signal of the defect of the detected wire rope, where mp is a minimum peak value of the magnetic flux signal of the defect;

step S32: comparing the magnetic flux signal of the detected wire rope with the preset threshold mp of the magnetic flux signal of the defect, and recording a plurality of groups of consecutive magnetic flux sampling points with magnetic flux signals being greater than the preset threshold mp of the magnetic flux signal of the defect, where axial coordinates of the plurality of groups of magnetic flux sampling points are [c11, c12, . . . , c1a], [c21, c22, . . . , c2b], . . . ;

step S33: calculating an average value of axial coordinates of each group of magnetic flux sampling points to obtain a sequence (c1, c2, . . . ), where c1=(c11+c12+ . . . + c1a)/a, c2=(c21+c22+ . . . +c2b)/b, . . . ;

step S34: setting a preset peak-to-peak value threshold vp of the MFL signal of the defect of the detected wire rope, where vp is a minimum preset peak-to-peak value of the MFL signal of the defect; and comparing the MFL signal of the detected wire rope with the preset peak-to-peak value threshold vp of the MFL signal of the defect, recording a plurality of groups of consecutive MFL sampling points with MFL signals being greater than the preset peak-to-peak value threshold vp of the MFL signal of the defect, and obtaining a sequence (d1, d2, . . . ), where axial coordinates of the plurality of groups of MFL sampling points are [d11, d12, . . . , d1e], [d21, d22, . . . , d2f], . . . ;

step S35: calculating an average value of a maximum value and a minimum value of axial coordinates of each group of MFL sampling points, namely, d1=(d11+d1e)/2, d2=(d21+d2f)/2, . . . ; and step S36: comparing the sequence (c1, c2, . . . ) with the sequence (d1, d2, . . . ); and if |ci−dj|<M, retaining ci and discarding dj; otherwise, retaining both ci and dj, and determining a calculation result as the defect position, where M is a strand distance of the wire rope.

As a further improvement of the present invention, the step of extracting the magnetic flux signal of the defect in step S40 includes: extracting, based on position information of each group of magnetic flux sampling points, FM points before and behind the magnetic flux signal of the wire rope to be the magnetic flux signal of the defect, where FM=NO× SM, SM represents a quantity of sampling points of one strand distance, and NO represents a natural number ranging from 5 to 10; and the step of extracting the MFL signal of the defect includes: extracting, based on position information of each group of MFL sampling points, LFM points before and behind the MFL signal of the wire rope to be the MFL signal of the defect, where LSM represents a quantity of sampling points of one strand distance, LFM=LNO×LSM, and LNO represents a natural number ranging from 5 to 10.

As a further improvement of the present invention, the step of calculating the defect width flw of the detected wire rope in step S50 includes the following steps:

step S51: obtaining a differentiation result h(s) of the magnetic flux signal of the defect of the detected wire rope according to a formula h(s)=df(s)/ds (s=1, 2, . . . , k), where k represents a quantity of pieces of data of the magnetic flux signal of the defect, and f(s) represents the data of the magnetic flux signal of the defect; and obtaining a position of a maximum value of h(s) before a position of a peak value of the waveform of the magnetic flux signal of the defect, obtaining a position of a minimum value of h(s) behind the position of the peak value of the waveform of the magnetic flux signal of the defect, and calculating a distance between the maximum value and the minimum value as a width value Ylw of the waveform of the magnetic flux signal of the defect;

step S52: calculating, based on a position of the peak value of the waveform of the MFL signal of the defect, a distance between a maximum value and a minimum value of the MFL signal of the defect as a width value Xlw of the waveform of the magnetic flux signal of the defect; and step S53: when |Ylw−Xlw|<M, selecting a relatively large value in Ylw and Xlw as the defect width flw; or when |Ylw−Xlw|≥M, calculating the defect width according to a formula flw=(Ylw+Xlw)/2−LF, where M represents a strand distance of the wire rope, and LF represents a distance between the sensor and a surface of the wire rope.

As a further improvement of the present invention, the step of calculating the defect cross-sectional area loss fs of the detected wire rope in step S60 includes the following steps:

step S61: calculating a peak-to-peak value VPP of the waveform of the magnetic flux signal of the defect based on the obtained peak value T of the waveform of the magnetic flux signal of the defect and a baseline value L of the waveform according to a formula VPP=|T−L|;

step S62: designing a relation function, namely, fs=f1 (VPP, flw), where f1 represents a trained system of higher-degree equations or multi-layer neural network; and step S63: substituting the defect width flw obtained in step S50 and the peak-to-peak value VPP of the waveform of the magnetic flux signal of the defect in step S61 into the system of higher-degree equations or multi-layer neural network in step S62, to calculate the defect cross-sectional area loss fs of the wire rope.

As a further improvement of the present invention, the trained system of higher-degree equations or multi-layer neural network, namely, f1, in step S62 is obtained by performing the following steps:

step S621: designing x defect widths and y defect cross-sectional area losses, namely, a total of x×y standard surface defects, where both x and y are natural numbers;

step S622: performing steps S10 to S60 to calculate corresponding peak-to-peak values of magnetic flux waveforms of the x×y standard surface defects; and step S623: performing training by using the corresponding peak-to-peak value of the magnetic flux waveform of the defect and the defect width of the standard surface defect as input independent variables, and the defect cross-sectional area loss as an output standard quantity, to obtain the trained system of higher-degree equations or multi-layer neural network, namely, f1.

The present invention further provides a nondestructive testing device for detecting and distinguishing an internal defect and an external defect of a wire rope, including:

an excitation structure, configured to excite a wire rope to a saturated state or an approximately saturated state;

a magnetic flux detection sensor, configured to acquire a magnetic flux signal of the detected wire rope;

a magnetic field strength detection sensor, configured to acquire an MFL signal of the detected wire rope; and a signal acquisition and processing system; where the signal acquisition and processing system performs processing by the above nondestructive testing method for detecting and distinguishing the internal defect and the external defect of the wire rope; and the signal acquisition and processing system includes a signal acquisition unit, a signal preprocessing unit, a defect position calculation unit, a defect signal extraction unit, a defect width calculation unit, a defect cross-sectional area loss calculation unit, a unit for distinguishing the internal defect and the external defect, and a defect depth calculation unit, where the signal acquisition unit is configured to acquire the magnetic flux signal and the MFL signal of the detected wire rope;

the signal preprocessing unit is configured to preprocess the magnetic flux signal and the MFL signal of the detected wire rope;

the defect position calculation unit is configured to compare a preprocessed magnetic flux signal and a preprocessed MFL signal with a preset magnetic flux signal threshold and a preset MFL signal threshold respectively, and calculate a defect position;

the defect signal extraction unit is configured to extract a magnetic flux signal of a defect and an MFL signal of the defect based on the defect position;

the defect width calculation unit is configured to calculate a defect width flw of the detected wire rope based on the magnetic flux signal of the defect and the MFL signal of the defect;

the defect cross-sectional area loss calculation unit is configured to calculate a defect cross-sectional area loss fs of the detected wire rope based on the defect width flw of the detected wire rope;

the unit for distinguishing the internal defect and the external defect is configured to determine whether the defect is an internal defect or an external defect based on the defect width flw of the detected wire rope and a peak-to-peak value FV of a waveform of the MFL signal of the defect; and the defect depth calculation unit is configured to calculate a defect depth based on the defect width flw of the defected wire rope, the defect cross-sectional area loss fs of the detected wire rope, and a virtual cross-sectional area loss ffs.

Compared with the prior art, the present invention has the following beneficial effects:

The technical solutions in the present invention excite the wire rope to the saturated state or the approximately saturated state, detect and acquire a magnetic flux and a flux of a leakage magnetic field, and perform calculation and analysis. In this way, all types of defects of the wire rope can be identified, the internal defect and the external defect can be distinguished, the defects can be detected accurately and quantitatively, and the defect depth can be calculated accurately, thereby achieving high quantitative accuracy.

Figure 1:
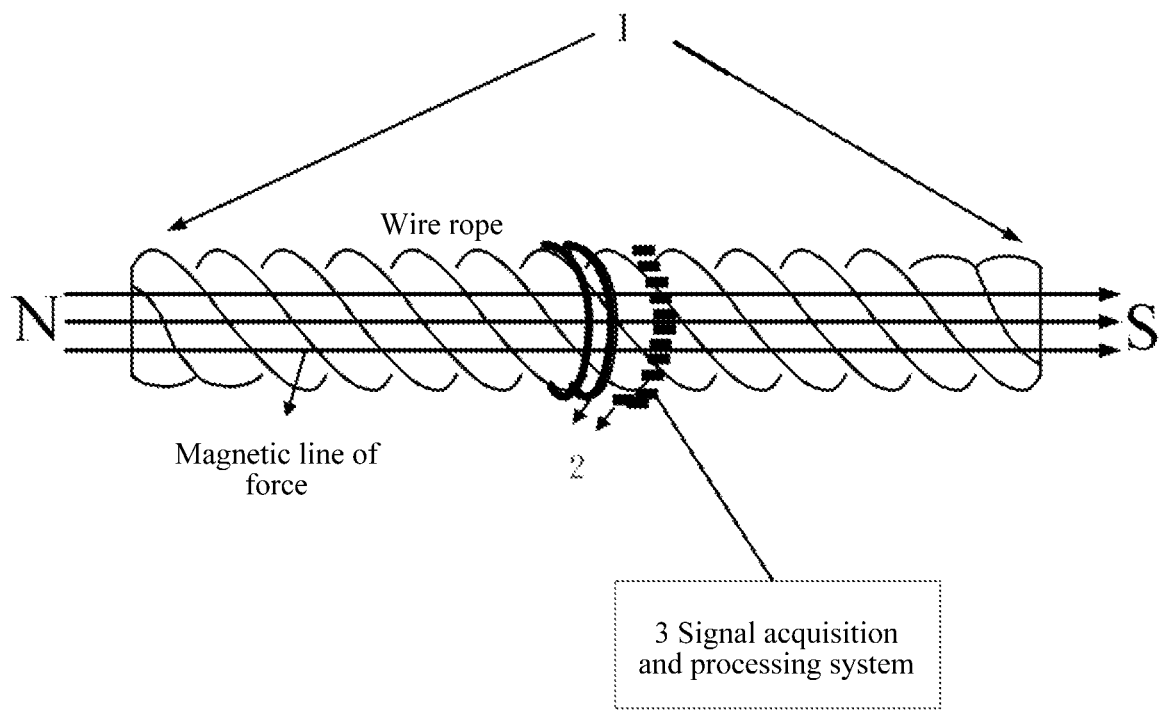
FIG. 1 is a schematic diagram of a nondestructive testing device for detecting and distinguishing an internal defect and an external defect of a wire rope according to the present invention.

Reference numerals include: 1: excitation structure; 2: sensor; 21: magnetic flux detection sensor; 22: magnetic field strength detection sensor; and 3: signal acquisition and processing system.

DETAILED DESCRIPTION OF THE EMBODIMENTS

The preferred embodiments of the present invention are further described in detail below.

Figure 2:
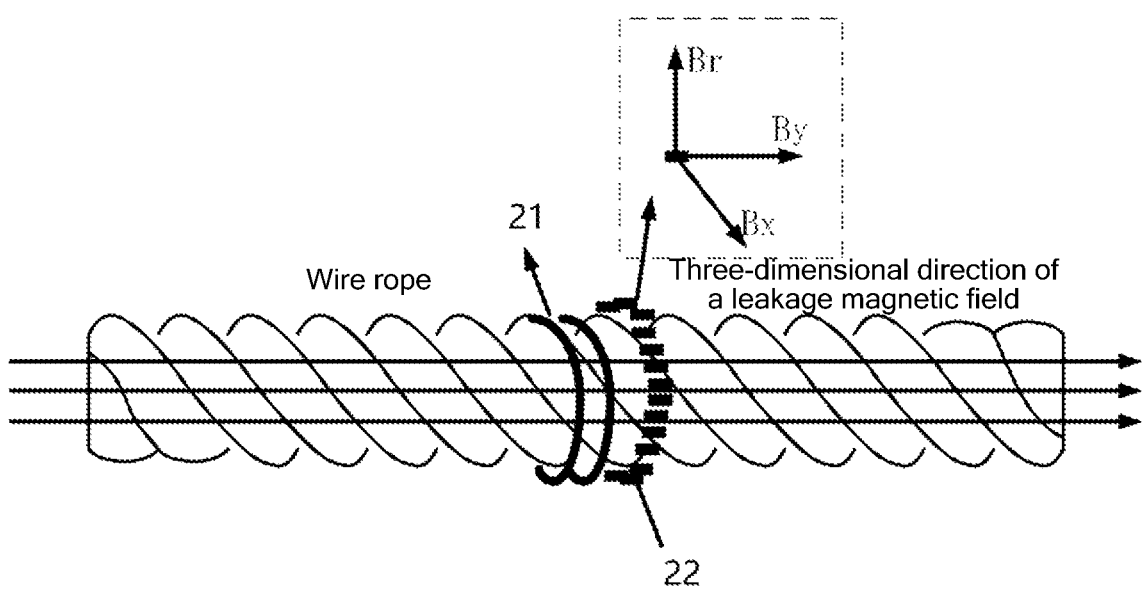
FIG. 2 is a schematic diagram of a sensor of a nondestructive testing device for detecting and distinguishing an internal defect and an external defect of a wire rope according to the present invention.

As shown in FIG. 1, a nondestructive testing device for detecting and distinguishing an internal defect and an external defect of a wire rope includes:

an excitation structure 1, configured to excite a wire rope to a saturated state or an approximately saturated state;

a sensor 2, including a magnetic flux detection sensor 21 configured to acquire a magnetic flux signal of the detected wire rope, and a magnetic field strength detection sensor 22 configured to acquire an MFL signal of the detected wire rope, as shown in FIG. 2; and a signal acquisition and processing system 3, including a signal acquisition unit, a signal preprocessing unit, a defect position calculation unit, a defect signal extraction unit, a defect width calculation unit, a defect cross-sectional area loss calculation unit, a unit for distinguishing the internal defect and the external defect, and a defect depth calculation unit, where the signal acquisition unit is configured to acquire the magnetic flux signal and the MFL signal of the detected wire rope;

the signal preprocessing unit is configured to preprocess the magnetic flux signal and the MFL signal of the detected wire rope;

the defect position calculation unit is configured to compare a preprocessed magnetic flux signal and a preprocessed MFL signal with a preset magnetic flux signal threshold and a preset MFL signal threshold respectively, and calculate a defect position;

the defect signal extraction unit is configured to extract a magnetic flux signal of a defect and an MFL signal of the defect based on the defect position;

the defect width calculation unit is configured to calculate a defect width flw of the detected wire rope based on the magnetic flux signal of the defect and the MFL signal of the defect;

the defect cross-sectional area loss calculation unit is configured to calculate a defect cross-sectional area loss fs of the detected wire rope based on the defect width flw of the detected wire rope;

the unit for distinguishing the internal defect and the external defect is configured to determine whether the defect is an internal defect or an external defect based on the defect width flw of the detected wire rope and a peak-to-peak value FV of a waveform of the MFL signal of the defect; and the defect depth calculation unit is configured to calculate a defect depth based on the defect width flw of the defected wire rope, the defect cross-sectional area loss fs of the detected wire rope, and ffs.

The signal acquisition and processing system performs processing by the following nondestructive testing method for detecting and distinguishing an internal defect and an external defect of a wire rope.

Figure 3:
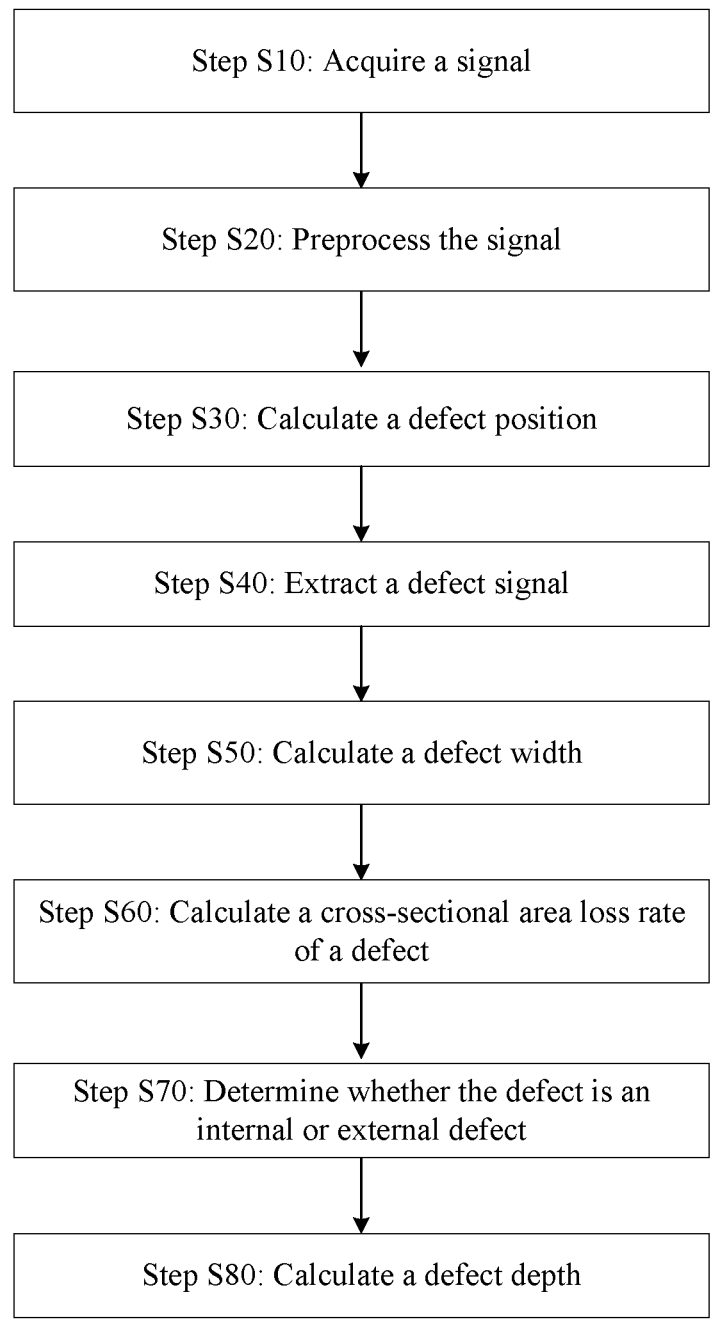
FIG. 3 is a flowchart of a nondestructive testing method for detecting and distinguishing an internal defect and an external defect of a wire rope according to the present invention.

Specifically, as shown in FIG. 3, the nondestructive testing method for detecting and distinguishing an internal defect and an external defect of a wire rope includes the following steps:

Step S10: Acquire a detection signal of a detected wire rope.

Step S20: Preprocess the detection signal of the detected wire rope.

Step S30: Calculate a defect position.

Step S40: Extract a defect signal.

Step S50: Calculate a defect width.

Step S60: Calculate a cross-sectional area loss rate of a defect.

Step S70: Determine whether the defect is an internal defect or an external defect.

Step S80: Calculate a defect depth.

The acquiring a detection signal of a detected wire rope in step S10 includes acquiring a magnetic flux signal and an MFL signal, specifically including:

obtaining the magnetic flux signal of the detected wire rope by using a magnetic flux detection sensor, obtaining the MFL signal of the detected wire rope by using a magnetic field strength detection sensor, and eliminating impact of a speed of the wire rope because the magnetic flux signal is affected by the speed of the wire rope and the speed of the wire rope cannot be accurately detected in real time. Time integration is performed on the magnetic flux signal S by using an integrator, and then data is acquired through equal-space sampling; or equal-distance space integration is performed on the magnetic flux signal S by using an integrator, and then acquisition is performed. Corresponding formulas are as follows:

$$\begin{cases} \overline{Y} = \int S dt \\ Y_i = \overline{Y}_m \, (i = 1, 2, \ldots, N) \end{cases}$$

-continued $$Y = \int S dl$$

and where, dt represents time differentiation, N represents a total quantity of sampling points, and dl represents differentiation of a spatial space.

The preprocessing the detection signal of the detected wire rope in step S20 includes: preprocessing the magnetic flux signal, and preprocessing the MFL signal. The step of preprocessing the magnetic flux signal includes performing outlier elimination, noise filtering, and baseline removal, to improve a signal-to-noise rate of the magnetic flux signal and facilitate feature extraction of the signal. The step of preprocessing the magnetic flux signal specifically includes the following steps:

Step S21: Perform outlier elimination on the magnetic flux signal Y. Assuming that Y(i) represents an $i^{th}$ magnetic flux acquisition signal. Y(i)=[Y(i−1)+Y(i+1)]/2 (i=1, 2, . . . , N) when Y(i) is much greater than previous and next magnetic flux signal values, a signal $Y_1(i)$ is obtained after outlier elimination, and N represents the total quantity of sampling points.

Step S22: Perform noise filtering on the magnetic flux signal of the detected wire rope through adaptive filtering, wavelet transform, smooth filtering, or empirical mode decomposition. A calculation formula of performing noise filtering on the magnetic flux signal of the detected wire rope through smooth filtering is as follows:

$$Y_2(i) = \frac{\sum_{i=m}^{m+n} Y_1(i)}{n} \quad (m = 1, 2, \ldots, N-n)$$

where, n represents a quantity of pieces of data to be averaged, and N represents the total quantity of sampling points.

Step S23: Perform baseline elimination on the above signal. Methods for baseline removal include but are not limited to envelope spectrum extraction, wavelet decomposition, window averaging, empirical mode decomposition, and the like. The empirical mode decomposition method includes: obtaining all maximum points and minimum points of a data sequence $Y_1(i)$ of the above signal, fitting the maximum points and the minimum points to be an upper envelope line and a lower envelope line of the original sequence respectively by using a cubic spline function, obtaining an average value m1 of the upper envelope line and the lower envelope line, and obtaining, by subtracting m1 from the data sequence, a new sequence $Y_2(i)$ with a low frequency being subtracted, namely, $Y_2(i)=Y_1(i)-m1$, where, n represents the quantity of pieces of data to be averaged, and N represents the total quantity of sampling points.

The step of preprocessing the MFL signal mainly includes performing outlier elimination, noise filtering, baseline removal, and strand wave filtering on each MFL signal, to improve a signal-to-noise rate of the MFL signal and facilitate feature extraction of the signal. The step of preprocessing the MFL signal specifically includes the following steps:

Step S24: Perform outlier elimination on each MFL signal X. Assuming that $X_{i,j}$ represents a $j^{th}$ sampling value of an $i^{th}$ Hall sensor. When $X_{i,j}$ is much greater than previous and next MFL signal values, $$X_{i,j} = \frac{X_{i,(j+1)} + X_{i,(j-1)}}{2}$$

A signal $X_{i,j}$ is obtained after outlier elimination.

Step S25: Perform nose filtering on each MFL signal. Methods for noise filtering include but are not limited to adaptive filtering, wavelet transform, smooth filtering, empirical mode decomposition, and the like. The performing nose filtering through smooth filtering is as follows:

$$\overline{X}_{i,j} = \frac{1}{n}\sum_{j=m}^{m+n} X_{i,j} \quad (i = 1, 2, \ldots, k, m = 1, 2, N-n)$$

where, n represents the quantity of pieces of data to be averaged, N represents the total quantity of sampling points, and k represents a quantity of paths of the sensor.

Step S26: Perform baseline elimination on each MFL signal of the detected wire rope through envelope spectrum extraction, wavelet decomposition, window averaging, and empirical mode decomposition. The step of performing baseline elimination on each MFL signal of the detected wire rope through empirical mode decomposition includes: obtaining all maximum points and minimum points of a data sequence Xy of an MFL signal obtained after outlier elimination, fitting the maximum points and the minimum points to be an upper envelope line and a lower envelope line of the original sequence respectively by using the cubic spline function, obtaining an average value n1 of the upper envelope line and the lower envelope line, and obtaining, by subtracting n1 from the original data sequence, a new sequence $X_1$ with a low frequency being subtracted, namely, $X_1$=Xy−n1.

Step S27: Perform strand wave noise filtering on each MFL signal of the detected wire rope through wavelet decomposition, empirical mode decomposition, or adaptive filtering, or by using a gradient method. The step of performing strand wave noise filtering on each MFL signal of the detected wire rope by using the gradient method includes:

performing first-order differentiation on an image by using the gradient method, where for an image $X_1(x,y)$, a gradient of the image $X_1(x,y)$ at coordinates (x,y) is expressed as a two-dimensional column vector:

$$\nabla f = \begin{bmatrix} G_x \\ G_y \end{bmatrix} = \begin{bmatrix} \frac{\partial f}{\partial x} \\ \frac{\partial f}{\partial y} \end{bmatrix}$$

where a module of the vector is:

$$\nabla f = mag(\nabla f) = [G_x^2 + G_y^2]^{\frac{1}{2}} = \left[\left(\frac{\partial f}{\partial x}\right)^2 + \left(\frac{\partial f}{\partial y}\right)^2\right]^{\frac{1}{2}}$$

and performing summation on a plurality of MFL signals to obtain an MFL sum signal $X_2$.

A method for calculating the defect position in step S30 includes the following steps:

Step S31: Set a preset threshold mp of the magnetic flux signal of the defect of the detected wire rope, where mp is a minimum peak value of the magnetic flux signal of the defect.

Step S32: Compare the magnetic flux signal of the detected wire rope with the preset threshold mp, and record a plurality of groups of consecutive magnetic flux sampling points, where axial coordinates of the plurality of groups of magnetic flux sampling points are [c11, c12, . . . , c1a], [c21, c22, . . . , c2b], . . . .

Step S33: Calculate an average value of axial coordinates of each group of magnetic flux sampling points, where c1=(c11+c12+ . . . +c1a)/a, c2=(c21+c22+ . . . +c2b)/b, . . . .

Step S34: Set a preset peak-to-peak value threshold vp of the MFL signal of the defect of the detected wire rope, where vp is a minimum preset peak-to-peak value of the MFL signal of the defect.

Step S34: Compare the magnetic flux signal of the detected wire rope with the preset threshold vp, and record a plurality of groups of consecutive MFL sampling points, where axial coordinates of the plurality of sampling points are [d11, d12, . . . , d1e], [d21, d22, . . . , d2f], . . . .

Step S35: Calculate an average value of a maximum value and a minimum value of axial coordinates of each group of MFL sampling points, namely, d1=(d11+d1e)/2, d2=(d21+d2f)/2, . . . .

Step S36: Compare (c1, c2, . . . ) with (d1, d2, . . . ); and if |ci−dj|<M, retain ci and discard dj; otherwise, retain both ci and dj, and determine a calculation result as the defect position, where M is a strand distance of the wire rope.

The extracting a defect signal in step S40 includes extracting the magnetic flux signal of the defect and extracting the MFL signal of the defect, which specifically include the following steps:

Step S41: Extract FM points before and behind the magnetic flux signal of the wire rope based on position information of each group of magnetic flux sampling points, where SM represents a quantity of sampling points of one strand distance, FM=NO×SM, NO ranges from 5 to 10 or may be set based on an actual detection situation, and the extracted data is used as the magnetic flux signal of the defect.

Step S42: Extract LFM points before and behind the MFL signal of the wire rope based on position information of each group of MFL sampling points, where LSM represents a quantity of sampling points of one strand distance, LFM=LNO×LSM, LNO ranges from 5 to 10 or may be set based on an actual detection situation, and the extracted data is used as the MFL signal of the defect.

Figure 4:
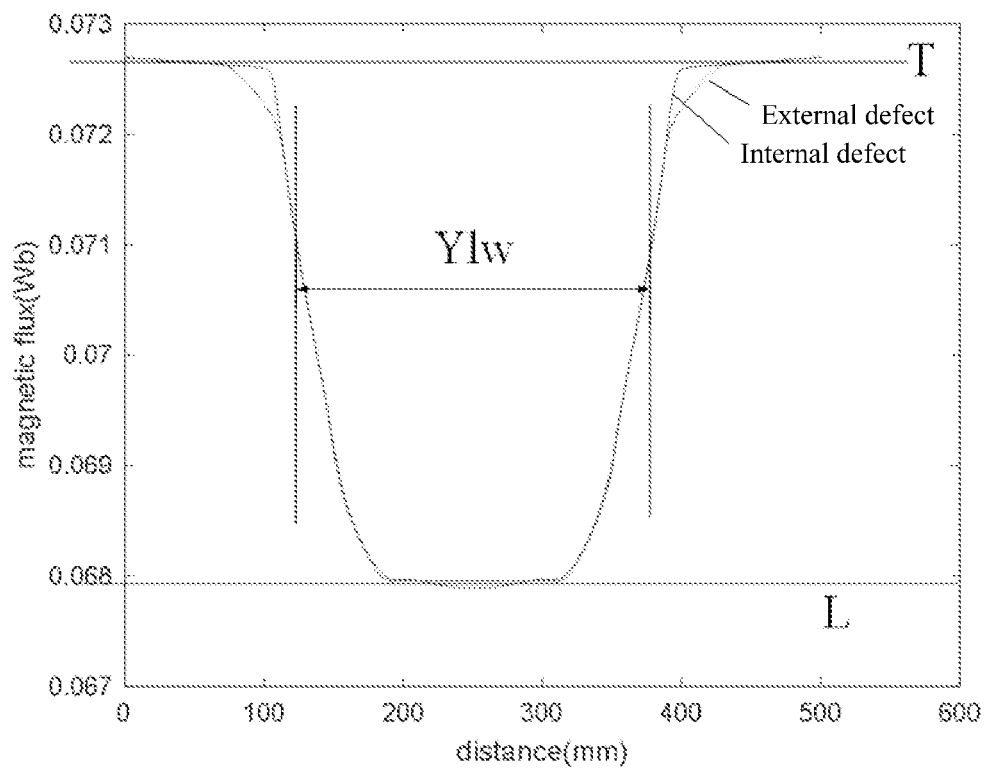
FIG. 4 is a schematic diagram of an obtained magnetic flux signal of a defect according to an embodiment of the present invention.

In step S50, a method for calculating the defect width includes the following steps:

Step S51: Obtain a differentiation result h(s) of the magnetic flux signal of the defect according to a formula h(s)=df(s)/ds (s=1, 2, . . . , k), where k represents a quantity of pieces of data of the magnetic flux signal of the defect, and f(s) represents the data of the magnetic flux signal of the defect; and obtain a position of a maximum value of h(s) before a position of a peak value of a waveform of the magnetic flux signal of the defect, obtain a position of a minimum value of h(s) behind the position of the peak value of the waveform of the magnetic flux signal of the defect, and calculate a distance between the maximum value and the minimum value as a width value Ylw of the waveform of the magnetic flux signal of the defect, as shown in FIG. 4.

Step S52: Calculate, based on a position of a peak value of the waveform of the MFL signal of the defect, a distance between a maximum value and a minimum value of the MFL signal of the defect as a width value Xlw of a waveform of the magnetic flux signal of the defect.

Step S53: When |Ylw−Xlw|<M, select a relatively large value in Ylw and Xlw as the defect width flw; or when |Ylw−Xlw|≥M, calculate the defect width according to a formula flw=(Ylw+Xlw)/2−LF, where M represents the strand distance of the wire rope, and LF represents a distance between the sensor and a surface of the wire rope.

In step S60, a method for calculating a defect cross-sectional area loss includes the following steps:

Step S61: Calculate a peak-to-peak value VPP of the waveform of the magnetic flux signal of the defect based on the obtained peak value T of the waveform of the magnetic flux signal of the defect and a baseline value L of the waveform according to a formula VPP=|T−L|.

Step S62: Design a relation function, namely, fs=f1(VPP, flw), where f1 represents a trained system of higher-degree equations or multi-layer neural network.

Step S63: Substitute the defect width flw obtained in step S50 and the peak-to-peak value VPP of the waveform of the magnetic flux signal of the defect in step S61 into the system of higher-degree equations or multi-layer neural network in step S62, to calculate the accurate metal defect cross-sectional area loss fs.

The trained system of higher-degree equations or multi-layer neural network, namely, f1, in step S62 is obtained by using the following method:

Step S621: Design x widths flw and y metal cross-sectional area losses fs, namely, a total of x×y standard surface defects, where both x and y are natural numbers.

Step S622: Perform steps S10 to S60 to calculate corresponding peak-to-peak values VPP of magnetic flux waveforms of the x×y standard surface defects.

Step S623: Perform training by using the peak-to-peak value VPP of the waveform and the defect width flw of the standard surface defect as input independent variables, and the cross-sectional area loss fs as an output standard quantity, to obtain the trained system of higher-degree equations or multi-layer neural network, namely, f1.

Figure 5:
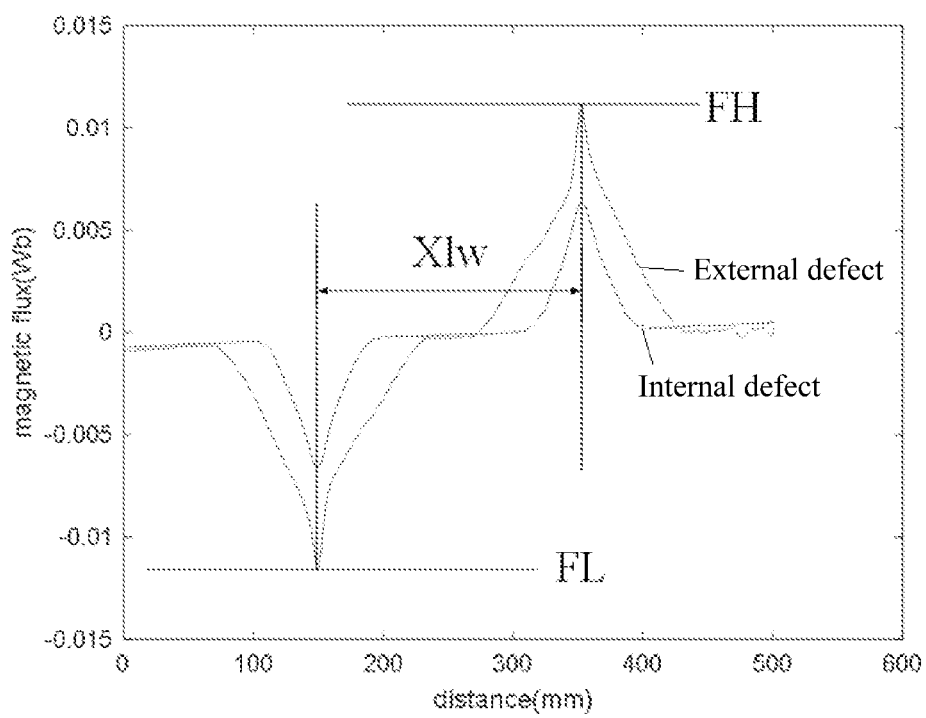
FIG. 5 is a schematic diagram of an obtained MFL signal of a defect according to an embodiment of the present invention.

In step S70, a method for determining whether the defect is the internal defect or the external defect includes the following steps:

Step S71: Obtain a peak value FH and a valley value FL of the waveform of the MFL signal of the defect, as shown in FIG. 5, and calculate a peak-to-peak value FV of the waveform of the MFL signal of the defect according to a formula FV=FH−FL.

Step S72: Design a relation function, namely, ffs=f2(FV, flw), where f2 represents a trained system of higher-degree equations or multi-layer neural network.

Step S73: Substitute the defect width flw obtained in step S50 and the peak-to-peak value FV of the waveform of the MFL signal of the defect in step S71 into the system of higher-degree equations or multi-layer neural network in step S72, to calculate the virtual cross-sectional area loss ffs.

Step S74: Compare ffs with fs in step S63, and if |fs−ffs|>μ, determine that the defect is the internal defect; otherwise, determine that the defect is the external defect, where may be set as a cross-sectional area loss rate of one fractured wire, or may be set based on an actual situation.

The trained system of higher-degree equations or multi-layer neural network, namely, f2, in step S72 is obtained by using the following method:

Step S721: Design x widths flw and y metal cross-sectional area losses fs, namely, a total of x×y standard surface defects, where both x and y are natural numbers.

Step S722: Perform steps S10 to S60 to calculate corresponding peak-to-peak values FV of MFL waveforms of the x×y standard surface defects.

Step S723: Perform training by using the peak-to-peak value FV of the waveform and the defect width flw of the standard surface defect as the input independent variables, and ffs as an output standard quantity, to obtain the trained system of higher-degree equations or multi-layer neural network, namely, f2.

In step S80, a method for calculating the defect depth includes the following steps:

Step S81: Based on a result of S70, if the defect is the external defect, determine that the defect depth is 0; otherwise, determine that the defect depth is not equal to 0, and perform step S82.

Step S82: Design a relation function, namely, fd=f3(fs, ffs, flw), where f3 represents a trained system of higher-degree equations or multi-layer neural network.

Step S83: Substitute the defect width flw obtained in step S50, fs obtained in step S60, and ffs obtained in step S70 into the system of higher-degree equations or multi-layer neural network in step S82, to calculate the defect depth fd.

The trained system of higher-degree equations or multi-layer neural network, namely, f3, in step S82 is follows by using the following method:

Step S821: Design x widths flw, y metal cross-sectional area losses fs, and z different depths fd, namely, a total of x×y×z standard defects, where x, y, and z are all natural numbers.

Step S822: Perform steps S10 to S70 to calculate corresponding ffs of each of the x×y×z standard defects.

Step S823: Perform training by using ffs, fs, and flw as the input independent variables, and fd as an output standard quantity, to obtain the trained system of higher-degree equations or multi-layer neural network, namely, f3.

According to the technical solutions in the embodiments, a wire rope is excited to a saturated state or an approximately saturated state, a magnetic flux signal and an MFL signal of the wire rope are acquired and preprocessed, magnetic signals of a defect are extracted, the magnetic flux signal of the defect and the MFL signal of the defect are calculated and analyzed separately, and calculation results of the two signals are fused and analyzed, to determine whether the defect is an internal defect or an external defect, further quantitatively calculate the defect, and finally obtain an accurate depth of the defect.

The present invention is described in further detail above with reference to the specific and preferred implementations, but the description should not be construed as a limitation to the specific implementation of the present invention. It will be apparent to those skilled in the art that certain simple modifications or substitutions may be made without departing from the spirit of the present invention, and all such modifications or substitutions are intended to be within the protection scope of the present invention.

What is claimed is:

1. A nondestructive testing method for detecting and distinguishing an internal defect and an external defect of a wire rope, comprising the following steps:

step S10: acquiring a magnetic flux signal and a magnetic flux leakage (MFL) signal of a detected wire rope;

step S20: preprocessing the magnetic flux signal and the MFL signal of the detected wire rope to obtain a preprocessed magnetic flux signal and a preprocessed MFL signal;

step S30: comparing the preprocessed magnetic flux signal and the preprocessed MFL signal with a preset magnetic flux signal threshold and a preset MFL signal threshold respectively, and calculating a defect position;

step S40: extracting a magnetic flux signal of a defect and an MFL signal of the defect based on the defect position;

step S50: calculating a defect width flw of the detected wire rope based on the magnetic flux signal of the defect and the MFL signal of the defect;

step S60: calculating a defect cross-sectional area loss fs of the detected wire rope based on the defect width flw of the detected wire rope; and step S70: determining whether the defect is the internal defect or the external defect, specifically comprising:

calculating a peak-to-peak value FV of a waveform of the MFL signal of the defect according to a formula FV=FH—FL, wherein FH represents a peak value of the waveform of the MFL signal of the defect, and FL represents a valley value of the waveform of the MFL signal of the defect;

designing a relation function ffs=f2(FV, flw), wherein f2 represents a first trained system of higher-degree equations or a first multi-layer neural network, and ffs represents a virtual cross-sectional area loss;

substituting the defect width flw obtained in step S50 and the peak-to-peak value FV of the waveform of the MFL signal of the defect into the relation function, to calculate the virtual cross-sectional area loss ffs; and comparing ffs with fs, and when |fs−ffs|>μ, determining that the defect is the internal defect; when |fs−ffs|>μ, determining that the defect is the external defect, wherein μ represents a preset defect decision value.

2. The nondestructive testing method for detecting and distinguishing the internal defect and the external defect of the wire rope according to claim 1, further comprising:

step S80: calculating a defect depth, specifically comprising:

based on a result of S70, when the defect is the external defect, determining that the defect depth is 0; when the defect is the internal defect, determining that the defect depth is not equal to 0, and performing the following step:

calculating the defect depth fd according to the following formula:

$$fd=f3(fs, ffs, flw)$$

wherein f3 represents a second trained system of higher-degree equations or a second multi-layer neural network, flw represents the defect width of the detected wire rope, fs represents the defect cross-sectional area loss of the detected wire rope, and ffs represents the virtual cross-sectional area loss.

3. The nondestructive testing method for detecting and distinguishing the internal defect and the external defect of the wire rope according to claim 2, wherein the first trained system of higher-degree equations or the first multi-layer neural network in step S70 is obtained by performing the following steps:

step S721: designing x defect widths and y defect cross-sectional area losses, namely, a total of x×y standard surface defects, wherein both x and y are natural numbers;

step S722: performing steps S10 to S60 to calculate corresponding peak-to-peak values of MFL waveforms of the x×y standard surface defects; and step S723: performing training by using the corresponding peak-to-peak values of the MFL waveforms of the x×y standard surface defects and the defect width of the standard surface defect as first input independent variables, and ffs as a first output standard quantity, to obtain the first trained system of higher-degree equations or the first multi-layer neural network; and the second trained system of higher-degree equations or the second multi-layer neural network in step S80 is obtained by performing the following steps:

step S821: designing x defect widths, y defect cross-sectional area losses, and z different depths, namely, a total of x×y×z standard defects, wherein x, y, and z are all natural numbers;

step S822: performing steps S10 to S70 to calculate corresponding ffs of each of the x×y×z standard defects; and step S823: performing training by using the ffs, the defect cross-sectional area loss, and the defect width as second input independent variables, and the defect depth as a second output standard quantity, to obtain the second trained system of higher-degree equations or the second multi-layer neural network.

4. The nondestructive testing method for detecting and distinguishing the internal defect and the external defect of the wire rope according to claim 2, wherein step S10 comprises: obtaining the magnetic flux signal of the detected wire rope by using a magnetic flux detection sensor, obtaining the MEL signal of the detected wire rope by using a magnetic field strength detection sensor, and performing the following step to preliminarily process the magnetic flux signal of the detected wire rope to eliminate impact of a speed of the detected wire rope:

performing time integration on the magnetic flux signal by using an integrator according to the following formula, and then acquiring data through equal-space sampling:

$$\begin{cases} \overline{Y} = \int S dt \\ Y_i = \overline{Y}_m \end{cases} (i = 1, 2, ..., N),$$

wherein $Y_i$ represents a preliminarily processed magnetic flux signal of the detected wire rope, S represents the magnetic flux signal of the detected wire rope, dt represents time differentiation, and N represents a total quantity of sampling points; or performing equal-distance space integration on the magnetic flux signal by using an integrator according to the following formula, and then performing acquisition:

$Y = \int S dl,$ wherein Y represents a preliminarily processed magnetic flux signal of the detected wire rope, dl represents differentiation of a spatial distance, and S represents the magnetic flux signal of the detected wire rope.

5. The nondestructive testing method for detecting and distinguishing the internal defect and the external defect of the wire rope according to claim 4, wherein the step of preprocessing the magnetic flux signal of the detected wire rope in step S20 comprises: performing outlier elimination, noise filtering, and baseline removal on the magnetic flux signal of the detected wire rope, wherein the step of performing the outlier elimination on the magnetic flux signal of the detected wire rope comprises:

performing the outlier elimination on the preliminarily processed magnetic flux signal Y of the detected wire rope, wherein assuming that Y(i) represents an $i^{th}$ magnetic flux acquisition signal, Y(i)=[Y(i−1)+Y(i+1)]/2 (i=1, 2, ..., N) when Y(i) is much greater than previous and next magnetic flux signal values, a signal $Y_1(i)$ is obtained after the outlier elimination, and N represents the total quantity of sampling points;

the step of performing the noise filtering on the magnetic flux signal of the detected wire rope comprises:

performing the noise filtering on the magnetic flux signal of the detected wire rope through adaptive filtering, wavelet transform, smooth filtering, or empirical mode decomposition, wherein a calculation formula of performing the noise filtering on the magnetic flux signal of the detected wire rope through the smooth filtering is as follows:

$$Y_2(i) = \frac{\sum_{i=m}^{m+n} Y_1(i)}{n} \quad (m = 1, 2, ..., N - n),$$

wherein n represents a quantity of pieces of data to be averaged, and N represents the total quantity of sampling points; and the step of performing the baseline removal on the magnetic flux signal of the detected wire rope comprises:

performing the baseline removal on the magnetic flux signal of the detected wire rope through envelope spectrum extraction, wavelet decomposition, window averaging, or the empirical mode decomposition, wherein the step of performing the baseline removal on the magnetic flux signal of the detected wire rope through the empirical mode decomposition comprises:

obtaining maximum points and minimum points of a data sequence $Y_2(i)$ of the signal, fitting the maximum points and the minimum points of the data sequence $Y_2(i)$ to be an upper envelope line and a lower envelope line of the data sequence $Y_2(i)$ respectively by using a cubic spline function, obtaining an average value m1 of the upper envelope line and the lower envelope line of the data sequence $Y_2(i)$, and obtaining, by subtracting m1 from the data sequence $Y_2(i)$, a new sequence $Y_3(i)$ with a first low frequency being subtracted, wherein $Y_3(i)=Y_2(i)−m1$; and the step of preprocessing the MFL signal of the detected wire rope in step S20 comprises: performing the outlier elimination, the noise filtering, the baseline removal, and strand wave noise filtering on each MFL signal of the detected wire rope, wherein the step of performing the outlier elimination on each MFL signal of the detected wire rope comprises:

performing the outlier elimination on each MFL signal X, wherein assuming that $X_{i,j}$ represents a $j^{th}$ sampling value of an $i^{th}$ Hall sensor, when $X_{i,j}$ is much greater than previous and next MFL signal values, $$X_{i,j} = \frac{X_{i,(j+1)} + X_{i,(j-1)}}{2},$$

wherein a signal $X_{i,j}$ is obtained after the outlier elimination;

the step of performing the noise filtering on each MFL signal of the detected wire rope comprises:

performing the noise filtering on each MFL signal of the detected wire rope through the adaptive filtering, the wavelet transform, the smooth filtering, or the empirical mode decomposition, wherein a calculation formula of performing the noise filtering on each MFL signal of the detected wire rope through the smooth filtering is as follows:

$$\overline{X}_{i,j} = \frac{1}{n}\sum_{j=m}^{m+n} X_{i,j} \quad (i = 1, 2, \ldots, k, m = 1, 2, \ldots, N-n),$$

wherein n represents the quantity of pieces of data to be averaged, N represents the total quantity of sampling points, and k represents a quantity of paths of the magnetic field strength detection sensor for acquiring the MFL signal of the detected wire rope;

the step of performing the baseline removal on each MFL signal of the detected wire rope comprises:

performing the baseline removal on each MFL signal of the detected wire rope through the envelope spectrum extraction, the wavelet decomposition, the window averaging, or the empirical mode decomposition, wherein the step of performing the baseline removal on each MFL signal of the detected wire rope through the empirical mode decomposition comprises:

obtaining maximum points and minimum points of a data sequence Xy of an MFL signal obtained after the outlier elimination, fitting the maximum points and the minimum points of the data sequence Xy to be an upper envelope line and a lower envelope line of the data sequence Xy respectively by using the cubic spline function, obtaining an average value n1 of the upper envelope line and the lower envelope line of the data sequence Xy, and obtaining, by subtracting n1 from the data sequence Xy, a new sequence X1 with a second low frequency being subtracted, wherein X1=Xy−n1; and the step of performing the strand wave noise filtering on each MFL signal of the detected wire rope comprises:

performing the strand wave noise filtering on each MFL signal of the detected wire rope through the wavelet decomposition, the empirical mode decomposition, or adaptive filtering, or by using a gradient method, wherein the step of performing the strand wave noise filtering on each MFL signal of the detected wire rope by using the gradient method comprises:

performing first-order differentiation on an image by using the gradient method, wherein for an image $X_1(x,y)$, a gradient of the image $X_1(x,y)$ at coordinates $(x,y)$ is expressed as a two-dimensional column vector:

$$\nabla f = \begin{bmatrix} G_x \\ G_y \end{bmatrix} = \begin{bmatrix} \frac{\partial f}{\partial x} \\ \frac{\partial f}{\partial y} \end{bmatrix},$$

wherein a module of the two-dimensional column vector is:

$$\nabla f = mag(\nabla f) = [G_x^2 + G_y^2]^{\frac{1}{2}} = \left[\left(\frac{\partial f}{\partial x}\right)^2 + \left(\frac{\partial f}{\partial y}\right)^2\right]^{\frac{1}{2}};$$

and performing summation on a plurality of MFL signals to obtain an MFL sum signal $X_2$.

6. The nondestructive testing method for detecting and distinguishing the internal defect and the external defect of the wire rope according to claim 5, wherein the step of calculating the defect position in step S30 comprises the following steps:

step S31: setting a preset threshold mp of the magnetic flux signal of the defect of the detected wire rope, wherein mp is a minimum peak value of the magnetic flux signal of the defect;

step S32: comparing the magnetic flux signal of the detected wire rope with the preset threshold mp of the magnetic flux signal of the defect, and recording a plurality of groups of consecutive magnetic flux sampling points with magnetic flux signals being greater than the preset threshold mp of the magnetic flux signal of the defect, wherein axial coordinates of the plurality of groups of consecutive magnetic flux sampling points are [c11, c12, . . . , c1a], [c21, c22, . . . , c2b], . . . ;

step S33: calculating an average value of axial coordinates of each group of consecutive magnetic flux sampling points to obtain a sequence (c1, c2, . . . ), wherein c1=(c11+c12+ . . . +c1a)/a, c2=(c21+c22+ . . . +c2b)/b, . . . ;

step S34: setting a preset peak-to-peak value threshold vp of the MFL signal of the defect of the detected wire rope, wherein vp is a minimum preset peak-to-peak value of the MFL signal of the defect; and comparing the MFL signal of the detected wire rope with the preset peak-to-peak value threshold vp of the MFL signal of the defect, recording a plurality of groups of consecutive MFL sampling points with MFL signals being greater than the preset peak-to-peak value threshold vp of the MFL signal of the defect, and obtaining a sequence (d1, d2, . . . ), wherein axial coordinates of the plurality of groups of consecutive MFL sampling points are [d11, d12, . . . , d1e], [d21, d22, . . . , d2f], . . . ;

step S35: calculating an average value of a maximum value and a minimum value of axial coordinates of each group of consecutive MFL sampling points, wherein d1=(d11+d1e)/2, d2=(d21+d2f)/2, . . . ; and step S36: comparing the sequence (c1, c2, . . . ) with the sequence (d1, d2, . . . ); and when |ci−dj|<M, retaining ci and discarding dj; when |ci−dj|≥M, retaining both ci and dj, and determining a calculation result as the defect position, wherein M is a strand distance of the detected wire rope.

7. The nondestructive testing method for detecting and distinguishing the internal defect and the external defect of the wire rope according to claim 6, wherein the step of extracting the magnetic flux signal of the defect in step S40 comprises: extracting, based on position information of the each group of consecutive magnetic flux sampling points, FM points before and behind the magnetic flux signal of the detected wire rope to be the magnetic flux signal of the defect, wherein FM=NO×SM, SM represents a quantity of sampling points of one strand distance, and NO represents a natural number ranging from 5 to 10; and the step of extracting the MFL signal of the defect comprises: extracting, based on position information of the each group of MFL sampling points, LFM points before and behind the MFL signal of the detected wire rope to be the MFL signal of the defect, wherein LSM represents a quantity of sampling points of one strand distance, LFM=LNO×LSM, and LNO represents a natural number ranging from 5 to 10.

8. The nondestructive testing method for detecting and distinguishing the internal defect and the external defect of the wire rope according to claim 7, wherein the step of calculating the defect width flw of the detected wire rope in step S50 comprises the following steps:

step S51: obtaining a differentiation result h(s) of the magnetic flux signal of the defect of the detected wire rope according to a formula h(s)=df(s)/ds (s=1, 2, . . . , k), wherein k represents a quantity of pieces of data of the magnetic flux signal of the defect, and f(s) represents the data of the magnetic flux signal of the defect; and obtaining a position of a maximum value of h(s) before a position of a peak value of a waveform of the magnetic flux signal of the defect, obtaining a position of a minimum value of h(s) behind the position of the peak value of the waveform of the magnetic flux signal of the defect, and calculating a distance between the maximum value and the minimum value as a width value Ylw of the waveform of the magnetic flux signal of the defect;

step S52: calculating, based on a position of the peak value of the waveform of the MFL signal of the defect, a distance between a maximum value and a minimum value of the MFL signal of the defect as a width value Xlw of the waveform of the magnetic flux signal of the defect; and step S53: when |Ylw−Xlw|<M, selecting a relatively large value in Ylw and Xlw as the defect width flw; or when |Ylw−Xlw|≥M, calculating the defect width according to a formula flw=(Ylw+Xlw)/2−LF, wherein M represents the strand distance of the detected wire rope, and LF represents a distance between the sensor and a surface of the detected wire rope.

9. The nondestructive testing method for detecting and distinguishing the internal defect and the external defect of the wire rope according to claim 8, wherein the step of calculating the defect cross-sectional area loss fs of the detected wire rope in step S60 comprises the following steps:

step S61: calculating a peak-to-peak value VPP of the waveform of the magnetic flux signal of the defect based on the peak value T of the waveform of the magnetic flux signal of the defect and a baseline value L of the waveform according to a formula VPP=|T−L|;

step S62: designing a relation function fs=f1(VPP, flw), wherein f1 represents a third trained system of higher-degree equations or a third multi-layer neural network; and step S63: substituting the defect width flw obtained in step S50 and the peak-to-peak value VPP of the waveform of the magnetic flux signal of the defect in step S61 into the third trained system of higher-degree equations or the third multi-layer neural network in step S62, to calculate the defect cross-sectional area loss fs of the detected wire rope; wherein the third trained system of higher-degree equations or the third multi-layer neural network in step S62 is obtained by performing the following steps:

step S621: designing x defect widths and y defect cross-sectional area losses to obtain a total of x×y standard surface defects, wherein both x and y are natural numbers;

step S622: performing steps S10 to S60 to calculate corresponding peak-to-peak values of magnetic flux waveforms of the x×y standard surface defects; and step S623: performing training by using the corresponding peak-to-peak values of the magnetic flux waveforms of the x×y standard surface defects and the defect width of the standard surface defect as third input independent variables, and the defect cross-sectional area loss as a third output standard quantity, to obtain the third trained system of higher-degree equations or the third multi-layer neural network.

10. A nondestructive testing device for detecting and distinguishing an internal defect and an external defect of a wire rope, comprising:

an excitation structure, wherein the excitation structure is configured to excite a wire rope to a saturated state or an approximately saturated state;

a magnetic flux detection sensor, wherein the magnetic flux detection sensor is configured to acquire a magnetic flux signal of the detected wire rope;

a magnetic field strength detection sensor, wherein the magnetic field strength detection sensor is configured to acquire a magnetic flux leakage (MFL) signal of the detected wire rope; and a signal acquisition and processing system, wherein the signal acquisition and processing system performs processing by the nondestructive testing method for detecting and distinguishing the internal defect and the external defect of the wire rope according to claim 2;

wherein the signal acquisition and processing system comprises a signal acquisition unit, a signal preprocessing unit, a defect position calculation unit, a defect signal extraction unit, a defect width calculation unit, a defect cross-sectional area loss calculation unit, a unit for distinguishing the internal defect and the external defect, and a defect depth calculation unit, wherein the signal acquisition unit is configured to acquire the magnetic flux signal and the MFL signal of the detected wire rope;

the signal preprocessing unit is configured to preprocess the magnetic flux signal and the MFL signal of the detected wire rope to obtain a preprocessed magnetic flux signal and a preprocessed MFL signal;

the defect position calculation unit is configured to compare the preprocessed magnetic flux signal and the preprocessed MFL signal with a preset magnetic flux signal threshold and a preset MFL signal threshold respectively, and calculate a defect position;

the defect signal extraction unit is configured to extract a magnetic flux signal of a defect and an MFL signal of the defect based on the defect position;

the defect width calculation unit is configured to calculate a defect width flw of the detected wire rope based on the magnetic flux signal of the defect and the MFL signal of the defect;

the defect cross-sectional area loss calculation unit is configured to calculate a defect cross-sectional area loss fs of the detected wire rope based on the defect width flw of the detected wire rope;

the unit for distinguishing the internal defect and the external defect is configured to determine whether the defect is the internal defect or the external defect based on the defect width flw of the detected wire rope and a peak-to-peak value FV of a waveform of the MFL signal of the defect; and the defect depth calculation unit is configured to calculate a defect depth based on the defect width flw of the defected wire rope, the defect cross-sectional area loss fs of the detected wire rope, and a virtual cross-sectional area loss ffs.

11. The nondestructive testing device according to claim 10, wherein the first trained system of higher-degree equations or the first multi-layer neural network in step S70 is obtained by performing the following steps:

step S721: designing x defect widths and y defect cross-sectional area losses, namely, a total of x×y standard surface defects, wherein both x and y are natural numbers;

step S722: performing steps S10 to S60 to calculate corresponding peak-to-peak values of MFL waveforms of the x×y standard surface defects; and step S723: performing training by using the corresponding peak-to-peak values of the MFL waveforms of the x×y standard surface defects and the defect width of the standard surface defect as first input independent variables, and ffs as a first output standard quantity, to obtain the first trained system of higher-degree equations or the first multi-layer neural network; and the second trained system of higher-degree equations or the second multi-layer neural network in step S80 is obtained by performing the following steps:

step S821: designing x defect widths, y defect cross-sectional area losses, and z different depths, namely, a total of x×y×z standard defects, wherein x, y, and z are all natural numbers;

step S822: performing steps S10 to S70 to calculate corresponding ffs of each of the x×y×z standard defects; and step S823: performing training by using the ffs, the defect cross-sectional area loss, and the defect width as second input independent variables, and the defect depth as a second output standard quantity, to obtain the second trained system of higher-degree equations or the second multi-layer neural network.

12. The nondestructive testing device according to claim 10, wherein step S10 comprises: obtaining the magnetic flux signal of the detected wire rope by using a magnetic flux detection sensor, obtaining the MFL signal of the detected wire rope by using a magnetic field strength detection sensor, and performing the following step to preliminarily process the magnetic flux signal of the detected wire rope to eliminate impact of a speed of the detected wire rope:

performing time integration on the magnetic flux signal by using an integrator according to the following formula, and then acquiring data through equal-space sampling:

$$\begin{cases} Y = \int S dt \\ Y_i = Y_m \end{cases} (i = 1, 2, ..., N),$$

wherein $Y_i$ represents a preliminarily processed magnetic flux signal of the detected wire rope, S represents the magnetic flux signal of the detected wire rope, dt represents time differentiation, and N represents a total quantity of sampling points; or performing equal-distance space integration on the magnetic flux signal by using an integrator according to the following formula, and then performing acquisition:

$$Y = \int S dl,$$

wherein Y represents a preliminarily processed magnetic flux signal of the detected wire rope, dl represents differentiation of a spatial distance, and S represents the magnetic flux signal of the detected wire rope.

13. The nondestructive testing device according to claim 12, wherein the step of preprocessing the magnetic flux signal of the detected wire rope in step S20 comprises:

performing outlier elimination, noise filtering, and baseline removal on the magnetic flux signal of the detected wire rope, wherein the step of performing the outlier elimination on the magnetic flux signal of the detected wire rope comprises:

performing the outlier elimination on the preliminarily processed magnetic flux signal Y of the detected wire rope, wherein assuming that Y(i) represents an $i^{th}$ magnetic flux acquisition signal, Y(i)=[Y(i−1)+Y(i+1)]/2 (i=1, 2, . . . , N) when Y(i) is much greater than previous and next magnetic flux signal values, a signal $Y_1(i)$ is obtained after the outlier elimination, and N represents the total quantity of sampling points;

the step of performing the noise filtering on the magnetic flux signal of the detected wire rope comprises:

performing the noise filtering on the magnetic flux signal of the detected wire rope through adaptive filtering, wavelet transform, smooth filtering, or empirical mode decomposition, wherein a calculation formula of performing the noise filtering on the magnetic flux signal of the detected wire rope through the smooth filtering is as follows:

$$Y_2(i) = \frac{\sum_{i=m}^{m+n} Y_1(i)}{n} \quad (m = 1, 2, ..., N-n),$$

wherein n represents a quantity of pieces of data to be averaged, and N represents the total quantity of sampling points; and the step of performing the baseline removal on the magnetic flux signal of the detected wire rope comprises:

performing the baseline removal on the magnetic flux signal of the detected wire rope through envelope spectrum extraction, wavelet decomposition, window averaging, or the empirical mode decomposition, wherein the step of performing the baseline removal on the magnetic flux signal of the detected wire rope through the empirical mode decomposition comprises:

obtaining maximum points and minimum points of a data sequence $Y_2(i)$ of the signal, fitting the maximum points and the minimum points of the data sequence $Y_2(i)$ to be an upper envelope line and a lower envelope line of the data sequence $Y_2(i)$ respectively by using a cubic spline function, obtaining an average value m1 of the upper envelope line and the lower envelope line of the data sequence $Y_2(i)$, and obtaining, by subtracting m1 from the data sequence $Y_2(i)$, a new sequence $Y_3(i)$ with a first low frequency being subtracted, wherein $Y_3(i)=Y_2(i)-m1$; and the step of preprocessing the MFL signal of the detected wire rope in step S20 comprises: performing the outlier elimination, the noise filtering, the baseline removal, and strand wave noise filtering on each MFL signal of the detected wire rope, wherein the step of performing the outlier elimination on each MFL signal of the detected wire rope comprises:

performing the outlier elimination on each MFL signal X, wherein assuming that $X_{i,j}$ represents a $j^{th}$ sampling value of an $i^{th}$ Hall sensor, when $X_{i,j}$ is much greater than previous and next MFL signal values, $$X_{i,j} = \frac{X_{i,(j+1)} + X_{i,(j-1)}}{2},$$

wherein a signal $X_{i,j}$ is obtained after the outlier elimination;

the step of performing the noise filtering on each MFL signal of the detected wire rope comprises:

performing the noise filtering on each MFL signal of the detected wire rope through the adaptive filtering, the wavelet transform, the smooth filtering, or the empirical mode decomposition, wherein a calculation formula of performing the noise filtering on each MFL signal of the detected wire rope through the smooth filtering is as follows:

$$\overline{X}_{i,j} = \frac{1}{n}\sum_{j=m}^{m+n} X_{i,j} \ (i=1,2,...,k, m=1,2,...,N-n),$$

wherein n represents the quantity of pieces of data to be averaged, N represents the total quantity of sampling points, and k represents a quantity of paths of the magnetic field strength detection sensor for acquiring the MFL signal of the detected wire rope;

the step of performing the baseline removal on each MFL signal of the detected wire rope comprises:

performing the baseline removal on each MFL signal of the detected wire rope through the envelope spectrum extraction, the wavelet decomposition, the window averaging, or the empirical mode decomposition, wherein the step of performing the baseline removal on each MFL signal of the detected wire rope through the empirical mode decomposition comprises:

obtaining maximum points and minimum points of a data sequence Xy of an MFL signal obtained after the outlier elimination, fitting the maximum points and the minimum points of the data sequence Xy to be an upper envelope line and a lower envelope line of the data sequence Xy respectively by using the cubic spline function, obtaining an average value n1 of the upper envelope line and the lower envelope line of the data sequence Xy, and obtaining, by subtracting n1 from the data sequence Xy, a new sequence X1 with a second low frequency being subtracted, wherein X1=Xy−n1; and the step of performing the strand wave noise filtering on each MFL signal of the detected wire rope comprises:

performing the strand wave noise filtering on each MFL signal of the detected wire rope through the wavelet decomposition, the empirical mode decomposition, or adaptive filtering, or by using a gradient method, wherein the step of performing the strand wave noise filtering on each MFL signal of the detected wire rope by using the gradient method comprises:

performing first-order differentiation on an image by using the gradient method, wherein for an image $X_1(x,y)$, a gradient of the image $X_1(x,y)$ at coordinates (x,y) is expressed as a two-dimensional column vector:

$$\nabla f = \begin{bmatrix} G_x \\ G_y \end{bmatrix} = \begin{bmatrix} \frac{\partial f}{\partial x} \\ \frac{\partial f}{\partial y} \end{bmatrix},$$

wherein a module of the two-dimensional column vector is:

$$\nabla f = mag(\nabla f) = [G_x^2 + G_y^2]^{\frac{1}{2}} = \left[\left(\frac{\partial f}{\partial x}\right)^2 + \left(\frac{\partial f}{\partial y}\right)^2\right]^{\frac{1}{2}};$$

and performing summation on a plurality of MFL signals to obtain an MFL sum signal $X_2$.

14. The nondestructive testing device according to claim 13, wherein the step of calculating the defect position in step S30 comprises the following steps:

step S31: setting a preset threshold mp of the magnetic flux signal of the defect of the detected wire rope, wherein mp is a minimum peak value of the magnetic flux signal of the defect;

step S32: comparing the magnetic flux signal of the detected wire rope with the preset threshold mp of the magnetic flux signal of the defect, and recording a plurality of groups of consecutive magnetic flux sampling points with magnetic flux signals being greater than the preset threshold mp of the magnetic flux signal of the defect, wherein axial coordinates of the plurality of groups of consecutive magnetic flux sampling points are [c11, c12, ..., c1a], [c21, c22, ..., c2b], ...;

step S33: calculating an average value of axial coordinates of each group of consecutive magnetic flux sampling points to obtain a sequence (c1, c2, ... ), wherein c1=(c11+c12+ ... +c1a)/a, c2=(c21+c22+ ... +c2b)/b, ...;

step S34: setting a preset peak-to-peak value threshold vp of the MFL signal of the defect of the detected wire rope, wherein vp is a minimum preset peak-to-peak value of the MFL signal of the defect; and comparing the MFL signal of the detected wire rope with the preset peak-to-peak value threshold vp of the MFL signal of the defect, recording a plurality of groups of consecutive MFL sampling points with MFL signals being greater than the preset peak-to-peak value threshold vp of the MFL signal of the defect, and obtaining a sequence (d1, d2, ... ), wherein axial coordinates of the plurality of groups of consecutive MFL sampling points are [d11, d12, ..., d1e], [d21, d22, ..., d2f], ...;

step S35: calculating an average value of a maximum value and a minimum value of axial coordinates of each group of consecutive MFL sampling points, wherein d1=(d11+d1e)/2, d2=(d21+d2f)/2, ...; and step S36: comparing the sequence (c1, c2, ... ) with the sequence (d1, d2, ... ); and when |ci−dj|<M, retaining ci and discarding dj; when |ci−dj|≥M, retaining both ci and dj, and determining a calculation result as the defect position, wherein M is a strand distance of the detected wire rope.

15. The nondestructive testing device according to claim 14, wherein the step of extracting the magnetic flux signal of the defect in step S40 comprises: extracting, based on position information of the each group of consecutive magnetic flux sampling points, FM points before and behind the magnetic flux signal of the detected wire rope to be the magnetic flux signal of the defect, wherein FM=NO×SM, SM represents a quantity of sampling points of one strand distance, and NO represents a natural number ranging from 5 to 10; and the step of extracting the MFL signal of the defect comprises: extracting, based on position information of the each group of MFL sampling points, LFM points before and behind the MFL signal of the detected wire rope to be the MFL signal of the defect, wherein LSM represents a quantity of sampling points of one strand distance, LFM=LNO×LSM, and LNO represents a natural number ranging from 5 to 10.

16. The nondestructive testing device according to claim 15, wherein the step of calculating the defect width flw of the detected wire rope in step S50 comprises the following steps:

step S51: obtaining a differentiation result h(s) of the magnetic flux signal of the defect of the detected wire rope according to a formula h(s)=df(s)/ds (s=1, 2, . . . , k), wherein k represents a quantity of pieces of data of the magnetic flux signal of the defect, and f(s) represents the data of the magnetic flux signal of the defect; and obtaining a position of a maximum value of h(s) before a position of a peak value of a waveform of the magnetic flux signal of the defect, obtaining a position of a minimum value of h(s) behind the position of the peak value of the waveform of the magnetic flux signal of the defect, and calculating a distance between the maximum value and the minimum value as a width value Ylw of the waveform of the magnetic flux signal of the defect;

step S52: calculating, based on a position of the peak value of the waveform of the MFL signal of the defect, a distance between a maximum value and a minimum value of the MFL signal of the defect as a width value Xlw of the waveform of the magnetic flux signal of the defect; and step S53: when |Ylw−Xlw|<M, selecting a relatively large value in Ylw and Xlw as the defect width flw; or when |Ylw−Xlw|≥M, calculating the defect width according to a formula flw=(Ylw+Xlw)/2−LF, wherein M represents the strand distance of the detected wire rope, and LF represents a distance between the sensor and a surface of the detected wire rope.

17. The nondestructive testing device according to claim 16, wherein the step of calculating the defect cross-sectional area loss fs of the detected wire rope in step S60 comprises the following steps:

step S61: calculating a peak-to-peak value VPP of the waveform of the magnetic flux signal of the defect based on the peak value T of the waveform of the magnetic flux signal of the defect and a baseline value L of the waveform according to a formula VPP=|T−L|;

step S62: designing a relation function fs=f1(VPP, flw), wherein f1 represents a third trained system of higher-degree equations or a third multi-layer neural network; and step S63: substituting the defect width flw obtained in step S50 and the peak-to-peak value VPP of the waveform of the magnetic flux signal of the defect in step S61 into the third trained system of higher-degree equations or the third multi-layer neural network in step S62, to calculate the defect cross-sectional area loss fs of the detected wire rope; wherein the third trained system of higher-degree equations or the third multi-layer neural network in step S62 is obtained by performing the following steps:

step S621: designing x defect widths and y defect cross-sectional area losses to obtain a total of x×y standard surface defects, wherein both x and y are natural numbers;

step S622: performing steps S10 to S60 to calculate corresponding peak-to-peak values of magnetic flux waveforms of the x×y standard surface defects; and step S623: performing training by using the corresponding peak-to-peak values of the magnetic flux waveforms of the x×y standard surface defects and the defect width of the standard surface defect as third input independent variables, and the defect cross-sectional area loss as a third output standard quantity, to obtain the third trained system of higher-degree equations or the third multi-layer neural network.

* * * * *